United States Patent
Kucharski et al.

(10) Patent No.: US 9,697,109 B2
(45) Date of Patent: Jul. 4, 2017

(54) DYNAMICALLY CONFIGURABLE TEST DOUBLES FOR SOFTWARE TESTING AND VALIDATION

(71) Applicant: PARASOFT CORPORATION, Monrovia, CA (US)

(72) Inventors: Marek Kucharski, Crakow (PL); Elizabeth Kolawa, Bradbury, CA (US); Piotr Pepek, Crakow (PL); Patrycjusz Franczak, Crakow (PL); Jakub Labenski, Crakow (PL); Miroslaw Zielinski, Crakow (PL)

(73) Assignee: Parasoft Corporation, Monrovia, CA (US)

( * ) Notice: Subject to any disclaimer, the term of this patent is extended or adjusted under 35 U.S.C. 154(b) by 256 days.

(21) Appl. No.: 14/708,706

(22) Filed: May 11, 2015

(65) Prior Publication Data

US 2015/0378880 A1    Dec. 31, 2015

Related U.S. Application Data

(60) Provisional application No. 62/017,709, filed on Jun. 26, 2014.

(51) Int. Cl.
    *G06F 9/44*      (2006.01)
    *G06F 11/36*      (2006.01)

(52) U.S. Cl.
    CPC ...... *G06F 11/3688* (2013.01); *G06F 11/3612* (2013.01)

(58) Field of Classification Search
None
See application file for complete search history.

(56) References Cited

U.S. PATENT DOCUMENTS

| | | | | |
|---|---|---|---|---|
| 8,352,923 | B2* | 1/2013 | Lopian | G06F 11/3688 703/22 |
| 9,317,405 | B2* | 4/2016 | Yoshida | G06F 11/3684 |
| 2007/0277158 | A1* | 11/2007 | Li | G06F 8/24 717/135 |
| 2009/0007073 | A1* | 1/2009 | Huang | G06F 11/3696 717/124 |
| 2011/0239194 | A1* | 9/2011 | Braude | G06F 11/3688 717/124 |

(Continued)

*Primary Examiner* — Insun Kang
(74) *Attorney, Agent, or Firm* — Lewis Roca Rothgerber Christie LLP

(57) ABSTRACT

Method for generating dynamically configurable test doubles for software testing includes: detecting functions or methods invocations in a source code under test; collecting information about parameters and return types of one or more of original functions and original methods that are invoked by the source code under test, generating test doubles using source code with alternative definitions based on collected information; instrumenting the source code under test to replace the calls to one or more of original functions and methods with calls to the generated test doubles; and dynamically configuring runtime behavior of the generated test doubles, where all input parameters and return values of the one or more of original functions and original methods are provided to respective retrieved trigger objects by passing said input parameters and return values as arguments to function calls.

9 Claims, 4 Drawing Sheets

(56) References Cited

U.S. PATENT DOCUMENTS

| | | | | |
|---|---|---|---|---|
| 2012/0174068 A1* | 7/2012 | Gutfleisch | ........... | G06F 11/3696 717/124 |
| 2015/0074647 A1* | 3/2015 | Levi | .................... | G06F 11/3672 717/124 |
| 2015/0220424 A1* | 8/2015 | Yoshida | .............. | G06F 11/3684 714/38.1 |
| 2015/0220425 A1* | 8/2015 | Yoshida | .............. | G06F 11/3684 717/124 |
| 2016/0140021 A1* | 5/2016 | Lopian | ................ | G06F 11/3668 717/130 |

* cited by examiner

DYNAMICALLY CONFIGURABLE TEST DOUBLES FOR SOFTWARE TESTING AND VALIDATION

CROSS-REFERENCE TO RELATED APPLICATIONS

This Patent Application claims the benefits of U.S. Provisional Patent Application Ser. No. 62/017,709, filed on Jun. 26, 2014 and entitled "Dynamically Configurable Test Doubles For Software Testing And Validation," the entire content of which is hereby expressly incorporated by reference.

FIELD OF THE INVENTION

The present invention relates generally to computer software testing, and more particularly to dynamically configurable test doubles for software testing and validation.

BACKGROUND

Software testing and validation often require substituting certain components of tested system with simplified replacements. This is usually done to provide a substitute for not yet ready components of the software under test, to isolate tested component from other possibly multi layered parts of the software under test, and/or to separate test code from production code. In the case of providing a substitute for not yet ready components, the substituting code has two roles: it enables assembling the test binary which would otherwise be impossible because of missing definitions, and it allows providing simplified implementation which can interact with tested components. In the case of isolating tested component, the roles of the substituting code are to limit the effort related to test environment setup by simplifying the logic of replaced component, to provide convenient interface to control side effects (e.g. return value), and to provide convenient interface for asserting expectations.

Test stubs (or stubs) are one kind of substituting code that simulate the behaviors of software components or modules that a program under test communicates with or depends on. Stubs act as temporary replacement for a called component and provide the same output as the actual product or software. Test stubs are static (hard-wired) and provide canned results to calls made during the test, however, test stubs usually do not respond to anything outside what's programmed therein for the test, that is, they depend on the test case and thus are limited in their functionality. Moreover, there is usually one test stub for all the test cases. This makes the management of the test system more difficult. For example, if any test case is modified, the test stub has to be modified as well. Test stubs are mainly used in incremental testing's top-down approach.

Mock objects are simulated objects that imitate the behavior of real objects in a controlled way, in object-oriented programming. A programmer typically creates a mock object to test the behavior of some other object. In a unit test, mock objects can simulate the behavior of complex real objects. As a result, mock objects are useful when a real object is impractical or impossible to incorporate into a unit test. Mock objects are limited to objects and thus to object oriented programming.

Moreover, mock objects are tightly related to their corresponding real objects and have the same interface as the real objects they mimic. This allows the software under test to remain unaware of whether it is using a real object or a mock object. Mock objects allow the programmer to specify which, and in what order, methods will be invoked on a mock object, what parameters will be passed to them, and what values will be returned and therefore are dynamic in their nature. The over-use of mock objects can closely couple the unit tests to the actual implementation of the software that is being tested, which affects testing a method's internal implementation rather than its external behavior, in unit tests.

Over-use of mock objects as part of a suite of unit tests can also result in a dramatic increase in the amount of maintenance that needs to be performed on the tests themselves during system evolution. Conversely, simply mocking one method might require far less configuration than setting up an entire real class and therefore reduce maintenance needs. Furthermore, mock objects have to accurately model the behavior of the object they are mocking, which can be difficult to achieve if the object being mocked comes from another developer or project, or if it has not even been written yet. If the behavior is not modeled correctly, then the unit tests may register a pass even though a failure would occur at run time under the same conditions that the unit test is exercising and thus rendering the unit test inaccurate.

SUMMARY

In some embodiments, the present invention is a computer-implemented method for generating dynamically configurable test doubles for software testing and validation. The method includes: detecting functions or methods invocations in a source code under test; collecting information about parameters and return types of one or more of original functions and original methods that are invoked by the source code under test, generating test doubles using source code with alternative definitions based on collected information. The generated test doubles do not include test-specific logic for testing the source code, but contain code to retrieve associated trigger objects that encapsulate test-specific logic from a trigger objects pool and execute the associated trigger objects. The method further include: instrumenting the source code under test to replace the calls to original functions and methods with calls to the generated test doubles; and dynamically configuring runtime behavior of the generated test doubles, where all input parameters and return values of the one or more of original functions and original methods are provided to respective retrieved trigger objects by passing said input parameters and return values as arguments to function calls.

The test doubles may be generated for all or a subset of functions and methods invoked by the source code under test. Moreover, the test doubles may dynamically be configured to perform specific activities, at runtime.

In some embodiments, the computer implemented method may further include: creating a test case including a plurality of trigger objects; dynamically calling each trigger object by a respective test double; executing the test case to dynamically configure each of the plurality of trigger objects to inject test-specific logic into the respective test double; and executing the dynamically configured trigger objects by calling the dynamically configured trigger objects by a computer program under test to test the computer program.

DETAILED DESCRIPTION

Figure 1:
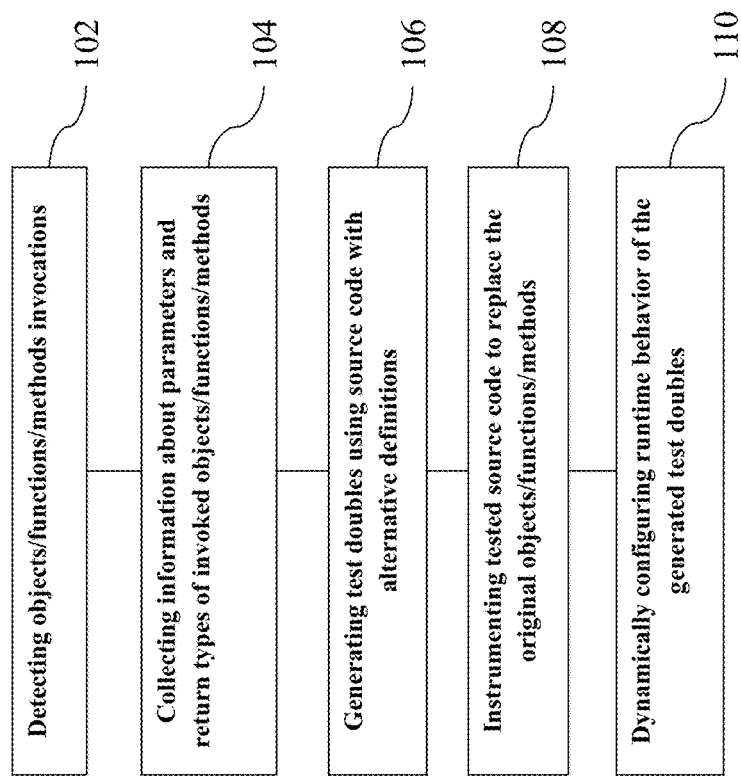
FIG. 1 is a simplified exemplary process flow, according to some embodiments of the present invention.

In some embodiments, the present invention generates dynamically configurable test doubles that take the advantages of both test stubs and mock object, without having their inherent limitations. In some embodiments, the present invention is a method for testing a computer program, in which a plurality of invoked functions and/or methods are identified in the computer program; a test double (proxy stub) is created for each of the plurality of invoked functions and/or methods, wherein the test doubles do not include test-specific logic, that is code for directing testing the computer program. For example, the test doubles typically do not examine input variable values, do not count number of calls and do not determine which value should be returned.

However, the test doubles of the present invention contain code which executes associated trigger objects that encapsulate test-specific logic. Execution of the trigger objects is augmented with input and output variables which are visible inside test double, so they can be read or modified by it. For example, a simple stubbed function may add two natural numbers. In such case, input variables comprise of two variables each containing a value to be added. An output variable is an allocated memory space to which the computer program provides a pointer, so that the given function can write to the allocated memory space. The code which calls that function therefore has access to data written to the allocated memory space. In this simple example, the code may be a pointer to a variable of numerical type, to which the result of summation will be written.

In some embodiments, the test doubles of the present invention contain code which retrieves associated trigger objects from a trigger objects pool. Secondly, all input and output variables of the original function or method are provided to the retrieved trigger object, by passing them as arguments to function calls, so they can be read or modified by it. Finally, configured logic in the triggered object is executed. Additionally, test double can invoke original symbol for which it has been created (if the original symbol is available). Such call can take place after the main trigger objects logic is executed and can be influenced by its executed logic. If the call takes place, another trigger object can be retrieved and its logic executed for additional processing, after the call to the original symbol.

The following is an example of a test double (Listing 1):

```
1   /** User stub definition for function: int getEventProcessorID(int, int) */
2   int getEventProcessorID (int priority, int eventId) ;
3   int CppTest_Stub_getEventProcessorID (int priority, int eventId)
4   {
5      int __return = 0;
6      int __callOrig = 0;
7
8      CPPTEST_ACTUAL_CALL("getEventProcessorID").WithArg("priority",
         ByRef(priority)).WithArg("eventId", ByRef(eventId)). WithArg("__return",
         ByRef(__return)). WithArg("__callOrig", ByRef(__callOrig));
9      if (__callOrig) {
10        int __return = getEventProcessorID(priority, eventId);
11        CPPTEST_ACTUAL_CALL("getEventProcessorID.post").WithArg("priority",
          ByRef(priority)).WithArg("eventId", ByRef(eventId)). WithArg("__return",
          ByRef(__return));
12        return __return;
13     }
14     return __return;
15  }
```

As shown, test double definition begins in line three, which includes the test double name, return type and input parameters. Input parameters and return type are the same as for stubbed function. In lines 5 and 6 helper variables are defined as:

"_callOrig" for controlling decision about calling or not calling the original definition "_return" used to store value which will be returned as a result of test double execution Those variables are passed to a trigger object to trigger the object upon the execution of the code, and assign values to those variables depending on the user defined test-specific logic.

In line 8, the trigger object is executed. Test double arguments (line 3) and helper variables from (lines 5,6) are provided to the trigger object (by "WithArg( )" methods).

In lines 9-12, the original function is called (if decided by user defined logic executed by trigger object at Line 8).

In line 10, the original function is invoked and in line 11, the trigger object is executed to perform additional user-defined logic specified as post-actions after original function's execution. In line 12, returning values are returned by the original function (possibly modified by the trigger object executed at line 11). Finally, in line 14, the computed value is returned.

The invention then allows creating a test case including a plurality of trigger objects, each trigger object to be dynamically called by a respective test double, and executes the test case to dynamically configure each of the plurality of trigger objects to inject test-specific logic into respective test double, the dynamically configured trigger objects to be called by the computer program to test the computer program. In some embodiments, the invention utilizes an application programming interface (API) to create and manipulate trigger objects. The API calls resemble high level programming language components, such as, keywords, operators and the like. Some of the calls also refer to the input and output arguments. API calls are translated to corresponding data structures and analyzed upon execution of the trigger objects, in the same way as programming language statements.

The following is an example of a trigger object creation and configuration (Listing 2):

```
CPPTEST_ON_CALL ("getEventProcessorID").
    If( ).Arg("priority").GreaterOrEqual(LIMIT_HIGH).Assert("Piority value too high").
    Else( ).If( ).Arg("priority").LessOrEqual(LIMIT_LOW).Assert("Piority value too low"):
```

In this example, CPPTEST_ON_CALL is a language construct used to create and initialize named trigger objects. CPPTEST_ON_CALL is a conventional name for trigger creation operation, which corresponds to the fact that trigger object is executed when test double is called (hence ON_CALL). The trigger object requires a unique name to be specified upon its creation. The trigger object name is used to associate the trigger object with respective test double(s). Although, the above example presents a syntax specific for C++ programming language, the same concept may be used for other programming languages, for which the syntax may be different. The sequence of operations specified after CPPTEST_ON_CALL defines the test specific logic to be performed upon the execution of the trigger object. In some embodiments, the trigger logic definition can be built using relational operators, logical operators, assignments, and value references.

FIG. 1 is a simplified exemplary process flow, according to some embodiments of the present invention. In some embodiments, the present invention is a method for generating dynamically configurable test doubles for software testing and validation. In block 102, functions/methods invocations are detected in a source code under test. In block 104, information about parameters and return types of invoked (original) functions/methods are collected. In block 106, test doubles are generated using the source code with alternative definitions. An example of generated test double (proxy stub) is presented in Listing 1 and described above. As a result, the test doubles are generated. However, unlike the conventional test stubs or mock objects, these generated test doubles do not include test-specific logic, that is, they do not examine input variable values, do not count number of calls and do not determine which value should be returned. Instead, the test doubles of the present invention contain code that executes associated trigger objects, which encapsulate test-specific logic. In block 108, the source code under test is instrumented to replace the original method/function with calls to the generated test doubles.

In some embodiments, the generation of test doubles relies on information collected during source code parsing. A generated test double may contain calls to test double's runtime to fetch information about a preconfigured behavior of the test double. In these embodiments, replacing calls to original functions/methods/objects is done with source code instrumentation and may involve changing the name of the function/method/object used at the place of invocation.

In block 110, runtime behavior of the generated test doubles (which are test scenario specific) are dynamically configured. For example, each trigger object is dynamically called by a respective test double, and when the test double is executed, each of the plurality of trigger objects is dynamically configured to inject test-specific logic into the respective test double. In some embodiments, all input parameters and return values of the one or more of original functions and original methods are provided to respective retrieved trigger objects by passing said input parameters and return values as arguments to function calls. The dynamically configured trigger objects are then called by the computer program to test the computer program. In some embodiments, the execution of the trigger objects is augmented with input and output variables which are visible inside the respective test doubles, so that the trigger objects can be read or modified by the respective test doubles.

In some embodiments, the test doubles of the present invention contain code which retrieves associated (relevant to the given test double) one or more trigger objects from a trigger objects pool. Subsequently, all input and output variables of the original function or method are provided to the retrieved trigger object, by passing them as arguments to function calls, so they can be read or modified by the retrieved trigger object. An example of test double configuration code is presented in Listing 2 and described above. Moreover, the test doubles may provide input and output variables to the trigger objects (so they can read from and modify those variables), may invoke retrieved trigger objects (to perform test specific actions), and optionally may invoke original function or method for which the test double(s) were generated.

The created test case may include code to define and/or configure trigger objects. The trigger objects are capable of dynamically configuring test-specific logic such as, actions, conditions, and computational expressions. The test-specific logic defined by trigger can be freely modified or erased during its entire life cycle The trigger may also include an API to define and manipulate the test-specific logic. The API may resemble high level programming language. The test-specific logic is then executed upon invocation by the related test double.

In some embodiments, user defined behavior of a test double may include, but not limited to checking arguments against specified values, setting arguments to specified values, enforcing return value, or calling any other function including original definition.

Detecting a plurality of invoked functions and/or methods may include parsing computer source code, reading and analyzing the binary components of the computer program (object files, byte code, intermediate language, libraries etc.), reading and analyzing executable code, or analyzing verbose output from compilation/linking/build (build tools).

Parsing the code is a well-known technique, which interprets textual information (source code) into a so called Abstract Syntax Tree (AST). The AST contains information about functions and methods being defined or executed. As an alternative to parsing source code, similar information may be obtained by reading artifacts of the computer program, which are created by compilers after parsing and translating AST into a byte-code, object file or executable file, all of which contain machine-understandable code representing original source code. This may be code for virtual machines or physical processors (CPU). As a result, reading those artifacts into memory and scanning for function definition or calls provides same information as that which can be obtained from the AST (parsing).

Figure 2:
FIGS. 2 and 3 illustrate the interactions of components/modules of a software under test, according to some embodiments of the present invention.
Figure 3:
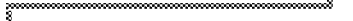

FIGS. 2 and 3 illustrate the interactions of components/modules of a software under test, according to some embodiments of the present invention. FIG. 2 depicts a simplistic, exemplary code which calls a function "getEvent" in line 17. This function is presented on the right hand side of FIG. 2, in lines 11 to 19. The function reads a sensor output and returns this reading to the calling code in a form of an integer value. After returning from the function, getEvent code further executes different branches in a "switch" statement, depending on the returned value in line 19.

FIG. 3 presents the same code after creation of a test double. A call to the "getEvent" function is redirected to a test double, which is called "getEvent_TestDouble," in lower line 11. In that test double, trigger objects are retrieved and their logic invoked with a macro "CPPTEST_ACTUAL_CAL," in lower line 13. It is noted that the presented code is only an example and actual implementations may differ from this particular example.

In some embodiments, test doubles can be generated for all functions/methods invoked by the software under test or only for a selected subset. In some embodiments, the process of test doubles generation starts with analyzing the source code under test and the build system. This can be done by compiler substitution in make-like systems, listener to the events in Jenkins-like systems or fully manual integration in a form of a script. No matter which method is used, the result is a set of files used in a build or produced as a part of the build available to the present invention, together with all relevant build tool-chain's options and external libraries. Those files are analyzed by parsing the source code or examining the created binary files and external libraries. Also, other build products can be utilized if relevant, for example, memory maps generated by linker. The following information is then extracted:

Which functions/methods are called from the code under test,

Type information about invoked functions'/methods' parameters and return value, and/or Information about existence of function method definition and its location (source code or binary library).

In some embodiments, this information is sufficient to generate source code with selected set of test doubles. Generated test doubles can coexist with original definitions, regardless if the original function/method is defined in the source code or in the binary library. This is possible because the name of the invoked function and the test double name are automatically adjusted (renamed), for example, at compilation time, depending on the presence of original symbol.

To prevent a computer program from having ambiguous call targets or variables, it is forbidden to have more than one symbol with the same name. Such ambiguity could cause non-deterministic program behavior. Therefore, in order to create test doubles for an existing method or function, the present invention modifies the name of the existing method or function. There are a number of approaches which can be applied to use a different name for the stubbed function or method and yet maintain an association with the original object. One approach is to use a suffix for a stub. Another approach is to pick a random name for the stub but maintain an external map. The present invention may employ any of the above renaming approaches, as long as the original call can be redirected to the correct stub function or method. When the original method or function implementation is not present in a build, an original symbol name is used for a test double.

Redirecting calls in the code from the original symbols to the test doubles can be achieved by source code instrumentation. Instrumented source code is compiled and build into test binary only for testing purposes. For example, the code presented in the FIG. 2 can be modified in an instrumentation process, for which line 17 would contain the following statement:

"int eventID=getEvent_TestDouble( )" instead of
 "int eventId=getEvent( )".

In other words, a process of source code instrumentation modifies the original source code replacement phrases and/or adds additional code. The instrumented code has different properties then the original code. Usually, the instrumented code has a larger footprint and memory consumption. It also has different timing. Therefore, for production purposes, it is desirable not to modify the code and just reconfigure test doubles.

The method of the present invention does not require creating mock objects since the code under test can call the same methods on mock objects as the original object. (Mock objects are objects which provide identical programming interfaces as the original objects.). If an original method is a member function of the object, it can still be replaced with a call to the test double.

In some embodiments, the body of a test double contains calls to test doubles runtime, which are responsible for fetching and performing preconfigured actions defined for specific test scenario, described below. The body of a test double can be modified by user if the automatically generated version is not sufficient or needs to be revised.

Test doubles can be dynamically configured to perform specific activity at runtime. In some embodiments, configuration of a test double is kept in dedicated storage area inside the test double runtime. Test double behavior can be reprogrammed unlimited number of times without a need to rebuild or restart the program under test. Different configurations of test double can be used for executing different test scenarios. A transient configuration of test double is stored in test doubles runtime using unique label.

Configuration of the test double is achieved with the trigger objects. The trigger objects are not necessarily objects in the sense of the object oriented programming languages. Rather, they are any kind of entities capable of encapsulating function or method behavior logic. They can be data structures, which contain a list of conditions, operations and references to the input and output variables, to be executed when test double is invoked.

Figure 4:
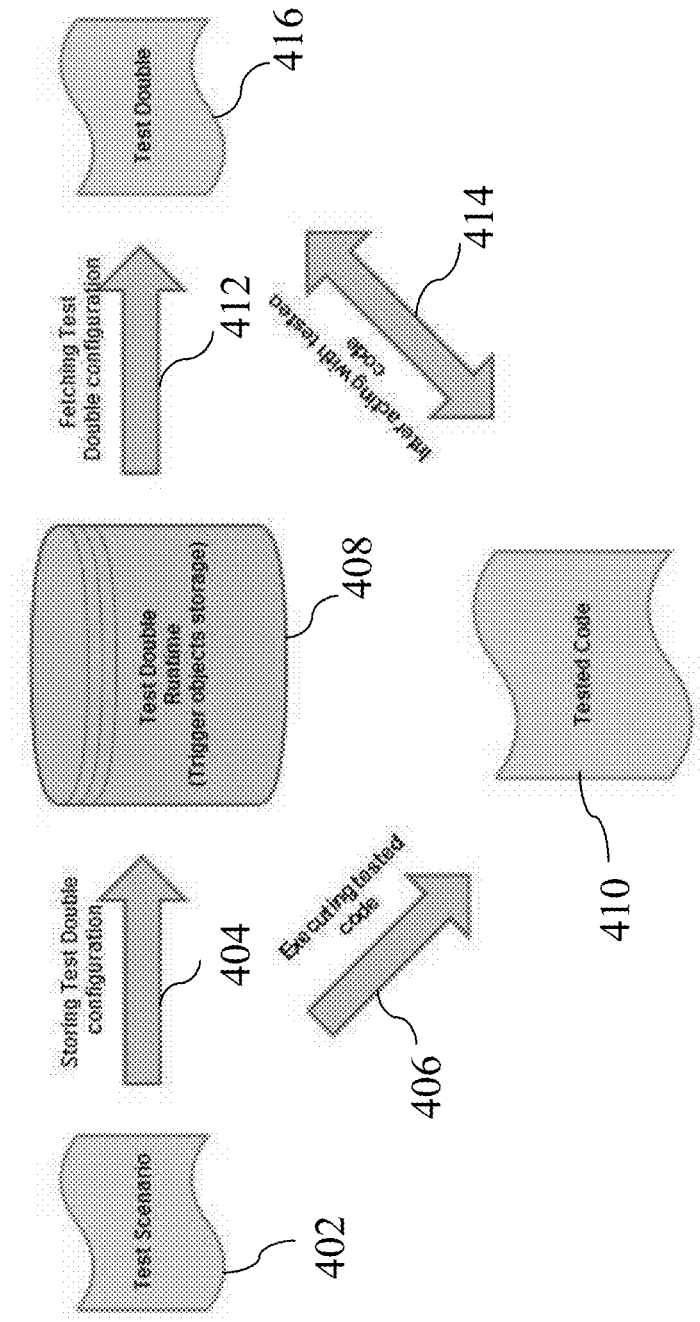
FIG. 4 depicts an exemplary test double runtime interaction, according to some embodiments of the present invention.

FIG. 4 depicts an exemplary test double runtime interaction, according to some embodiments of the present invention. In this example, test scenario 402 is a computer code executed to simulate actions, which may happen during program execution. The arrow 404 represents a fragment of the test scenario, in which test doubles API is called to program how test double should behave, for example whether they should always return 0, return 0 on the first call and 1 on the second, and so on. As a result of such call, a test double object is created and stored in memory. Storage medium 408 stores computer code and provides test doubles objects. Arrow 412 represents the fact that test double objects 416 can be retrieved during computer code runtime and used to simulate program behavior. Arrow 406 represents the action of executing test scenario, during which code under test 410 is also executed. Arrow 414 represents the fact that the code under test does not call the original methods or functions, but instead, calls function of the test double object.

The present invention provides an API for the test creator to configure the desired logic inside trigger objects. An example of the trigger object and its API is provided below. Trigger objects are created in a test case and stored in a runtime. Test double retrieves the trigger objects and executes their logic. That way, test double is fully configurable from within test case.

In some embodiments, a trigger object can accumulate a set of operations and values. The operations and values are defined by specifying a sequence of calls to the methods of trigger objects API. Names of mentioned methods intentionally resemble high level programming language keywords and operators. As a result, semi-symbolic notations can be achieved.

An example of trigger object definition (inside test scenario) to configure particular test double is shown below:

```
/* CPPTEST_TEST_CASE_BEGIN onEvent_1 */
/* CPPTEST_TEST_CASE_CONTEXT int onEvent(int, int) */
void TestSuite_cpp_8602ac7c::onEvent_1( )
{
CPPTEST_ON_CALL("getEvent").If( ).Arg("param1").Equal(0).Arg("___return")
.Assign(1);
    /* Remaining part of test scenario */
}
```

This exemplary trigger object, created using CPPTEST_ON_CALL macro, specifies a command to assign value (1) to the argument named "_return" under the condition of "param1" being equal to value (0)

The corresponding usage of the trigger inside test double is shown below:

```
/** User stub definition for function: int goo(int, int) */
int getEvent (int) ;
int CppTest_TestDouble_getEvent (int param1)
{
    int___return = 0;
    CPPTEST_ACTUAL_CALL("getEvent ").WithArg("param1",
ByRef(param1)).
        WithArg("___return", ByRef(___return));
    return___return;
}
```

In this example, trigger object, executed with CPPTEST_ACTUAL_CALL macro, is provided with real, runtime values to execute sequence of actions specified at definition. In this case, named variable "param1" will be associated with test double function argument param1 and local variable_return will be associated with named variable "_return."

Below is an illustrative list of selected operations (methods) available for defining test double behavior (CPPTEST_ON_CAL):

Arg, If, Else, Assign, Or, And, Equal, NotEqual, Greater, GreaterOrEqual, Less, LessOrEqual, Not, At, and Value In some embodiments, the list of operations can be extended for ease of use and convenience. For example, a logic of "a<b or a=b" can be described with a sequence of API calls (representing subsequently "<", "or" and "=") or one call (representing "<=" operator). A named value is a concept of giving a label to actual variables, so that a programmer can reference them consistently without using the variables. For example, a "_param1" may refer to the first argument of the given test double. An actual argument may have different name and may even be completely not accessible from the place in a test case where the trigger is defined. Test double runtime is capable of interpreting names and resolving them to the actual variable references in the code.

The meaning of the illustrative operations listed above may be directly derived from C++ language. Operations can be combined to form statements. Trigger objects can accumulate unlimited number of statements. Execution of the trigger objects usually located inside a test double is supplemented with values and variables which serve as a context for defined operations and reflect side effects of trigger execution.

As a result, the present invention does not require definition and instantiation of the conventional mock objects to apply test double; does not require changing the body of test double to reflect expected behavior defined in test scenario; is not based on templates and therefore it can be used by wider range of compilers; is available for non-object oriented languages, such as C; and is based on generic set of operations derived from the given programming language, which provides much more flexibility in defining test double behavior in contrast to the conventional object mocking frameworks, which are configured via specialized operations which have less flexibility.

Moreover, the present invention is capable of performing function calls and non-virtual method calls, which are lacking capabilities for mock objects. Functions and non-virtual method calls are resolved by a linker during the build phase and cannot be changed during computer runtime. Mock object rely on resolving method calls during runtime. According to some embodiments of the present invention, calls are also resolved during link time, however, calls are redirected to test doubles, instead of the original function or method. Test doubles then can redirect call to the original symbol(s) or the test double object(s).

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A method for generating dynamically configurable test doubles for software testing and validation, the method comprising:
  detecting functions or methods invocations in a source code under test;
  collecting information about parameters and return types of one or more of original functions and original methods that are invoked by the source code under test;
  generating test doubles using source code with alternative definitions based on the collected information by a computer, wherein the generated test doubles do not include test-specific logic for testing the source code under test, wherein the generated test doubles contain pointers to associated trigger objects that encapsulate test-specific logic to retrieve said associated trigger objects from a trigger objects pool and execute the associated trigger objects, and wherein each trigger object is dynamically called by a respective test double of the generated test doubles, and when each test double is executed, each of the trigger objects associated with said respective test double is dynamically configured to inject test-specific logic into said respective test double;

instrumenting the source code under test to replace the calls to the one or more original functions and original methods with calls to the generated test doubles;

dynamically configuring runtime behavior of the generated test doubles at run-time, wherein all input parameters and return values of the one or more of original functions and original methods are provided to respective retrieved trigger objects by passing said input parameters and return values as arguments to function calls; and executing the dynamically configured test doubles by the computer to test the source code under test.

2. The method of claim 1, wherein the test doubles are dynamically configured to perform specific activities, at runtime.

3. The method of claim 1, wherein a configuration of a test double is kept in a dedicated storage area inside a test double runtime.

4. The method of claim 1, wherein test doubles are generated for all functions and methods invoked by the source code under test.

5. The method of claim 1, wherein test doubles are generated for a selected subset of functions and methods invoked by the source code under test.

6. The method of claim 1, wherein generating test doubles using source code with alternative definitions comprises analyzing the source code under test by a compiler substitution.

7. The method of claim 1, further comprising:
creating a test case including a plurality of the trigger objects;
dynamically calling each of the plurality of the trigger objects by each respective test double of the generated test doubles;
executing the test case to dynamically configure each of the plurality of trigger objects to inject test-specific logic into each respective test double; and
executing the dynamically configured trigger objects by calling the dynamically configured trigger objects by the source code under test to test the source code under test.

8. The method of claim 1, wherein execution of the dynamically configured trigger objects is augmented with input and output variables that are visible inside the respective test doubles, so that the input and output variables can be read or modified by the respective test doubles.

9. The method of claim 1, further comprising generating and manipulating the trigger objects by an application programming interface (API).

* * * * *